United States Patent [19]

Walter et al.

[11] Patent Number: 4,562,332

[45] Date of Patent: Dec. 31, 1985

[54] SURFACE CRACK HEALING WITH HIGH-ENERGY BEAM

[75] Inventors: Robert J. Walter, Thousand Oaks; Jack R. Lewis, Granada Hills, both of Calif.; Charles M. Moss, Ra'anana, Israel

[73] Assignee: Rockwell International Corporation, El Segundo, Calif.

[21] Appl. No.: 593,066

[22] Filed: Mar. 26, 1984

[51] Int. Cl.⁴ .............................................. B23K 15/00
[52] U.S. Cl. ........................... 219/121 EM; 29/402.01; 29/402.21; 148/4; 219/121 EG; 219/121 EV; 219/121 LF; 219/121 LW; 219/121 LM
[58] Field of Search ............... 219/121 EM, 121 EB, 219/121 EV, 121 EW, 121 EF, 121 EG, 121 ES, 121 EX, 121 EY, 121 EA, 121 L, 121 LM, 121 LE, 121 LF, 121 LW; 148/4; 29/402.01, 402.17, 402.21

[56] References Cited

U.S. PATENT DOCUMENTS

| | | | |
|---|---|---|---|
| 3,617,685 | 11/1971 | Brill-Edwards et al. | 219/121 EB |
| 3,848,104 | 11/1974 | Locke | 219/121 LE |
| 4,050,133 | 9/1977 | Cretella et al. | 29/402.21 X |
| 4,125,417 | 11/1978 | Antony | 138/4 X |
| 4,250,610 | 2/1981 | Wilbers et al. | 148/11.5 R |
| 4,382,186 | 5/1983 | Denholm et al. | 219/121 EB |
| 4,486,240 | 12/1984 | Sciaky | 219/121 EM X |

Primary Examiner—Clifford C. Shaw
Assistant Examiner—Alfred S. Keve
Attorney, Agent, or Firm—H. Fredrick Hamann; Harry B. Field

[57] ABSTRACT

A method for healing surface cracks 10, especially in metals, by scanning a high-energy, diffused, pulsed electron-beam past a crack 10 in a slowly moving specimen object 12. The crack 10 moves laterally with respect to the beam so that the beam pattern 14 is a sawtooth pattern comprising a series of overlapping circles 22, each comprising one pulse of diffused energy.

10 Claims, 3 Drawing Figures

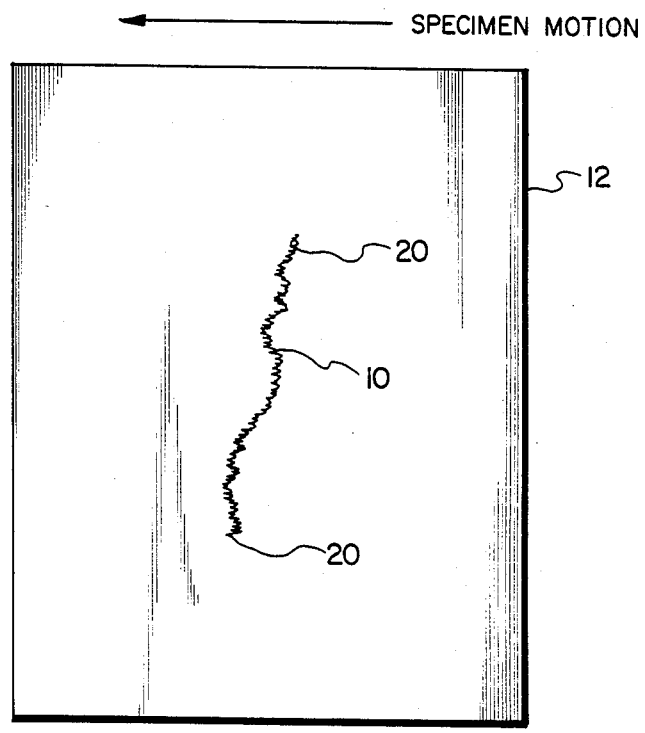
Fig.1.
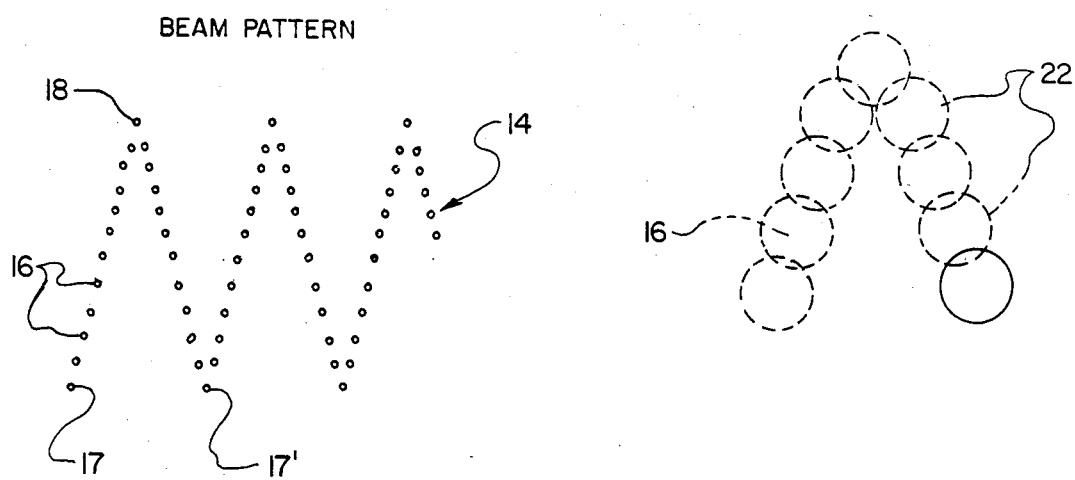
Fig.2.
Fig.3.

SURFACE CRACK HEALING WITH HIGH-ENERGY BEAM

BACKGROUND OF THE INVENTION

1. Field of the Invention

This invention relates to the sealing of surface cracks in metals and especially to a method for sealing surface cracks in metals by the use of a scanning, high-energy beam.

2. Description of the Prior Art

High-energy beams have been used for a number of years to apply surface treatments to many materials. A beam, such as a laser or electron beam, has been employed to melt the surface layer of materials to improve their mechanical properties. It was thought that a beam could be used to fuse the surface of cracks in metals and thereby seal the crack to the environment. Once the surface of a crack is sealed, the interior can be healed by hot isostatic pressing. The difficulty in using a high-energy beam to seal surface cracks is that surface cracks tend to become larger because application of a high-energy beam induces thermal shock in the material. The large thermal shock associated with a high-energy beam generates thermal strain in the surface which prevents the healing of the crack.

OBJECTS OF THE INVENTION

An object of the invention is to heal a surface crack in a metal.

A further object is to fuse surface cracks by the use of a high-energy beam.

Other objects, advantages and novel features of the present invention will become apparent from the following detailed description of the invention when considered in conjunction with the accompanying drawing.

SUMMARY OF THE INVENTION

The objects and advantages of the present invention are obtained by scanning the length of a surface crack in a specimen object with a lengthwise oscillating, diffused beam of high-energy while slowly moving the specimen in a lateral direction with respect to the beam-scan direction. The beam fuses the surface edges of the crack without thermally straining the material so as to enlarge the crack. The treatment is a surface treatment of cracks, rather than a deep healing.

BRIEF DESCRIPTION OF THE DRAWINGS

FIG. 1 is a schematic illustration of a surface crack in a specimen.

FIG. 2 is a schematic illustration of the healing beam pattern.

FIG. 3 is a schematic illustration of the diffused beams.

The same elements or parts throughout the figures of the drawing are designated by the same reference characters, while equivalent elements bear a prime designation.

DETAILED DESCRIPTION OF THE PREFERRED EMBODIMENTS

FIG. 1 illustrates a surface crack 10 in a metallic specimen 12. The material from which the specimen 12 is fabricated is generally a metal. In a particular case, the metal was MAR-M-246, which is an alloy of iron, nickel and chromium plus age-hardening materials such as titanium, molybdenum, aluminum and carbon.

An electrol-beam welder operated at 50 KV and 37 ma was used to provide a high-energy beam. The beam was diffused and pulsed so that the level of energy applied to the material 12 did not produce enough thermal shcok to increase the crack width rather than heal it. The electrol beam was made to oscillate vertically (lengthwisse with respect to the crack) and the specimen 12 was caused to move laterally at a slow rate of about 25 inches per minute (slow relative to the oscillatory rate of the beam). The beam moves up and down (in the vertical direction in FIG. 1) relative to the specimen 12 and pattern 14, in which the beam moves over the specimen 12 is thus a sawtooth as shown in FIG. 2. The beam takes 0.0015 secs to complete a one-inch wide pattern from one end to the other (left to right) and return. The beam pattern 14 was thus a series of spaced dots 16, each denoting the center of a pulse of the electron beam, the series of dots forming a sawtooth pattern. The peaks 17 and 18 of the pattern 14 extended past the ends 20 of the crack 10. The horizontal separation of the sweep lines in FIG. 2 is greatly exaggerated for purposes of clarity; actually the sweep lines are very close. Although the dots 16 in FIG. 2 are shown as spaced, in actuality the beams from the individual pulses overlapped each other, as seen in FIG. 3, because the beam was diffused. The dots 16 denote the centers, or focal points, of the circular, diffused beam areas 22. It should be noted that the speeds of the sweep and the motion of the specimen should be related to each other in a way that allows the beam to melt the opposite sides of the crack so that they surface-fuse. It may, in some instances, be more desirable to sweep the beam laterally and move the specimen vertically.

The healing beam does not necessarily have to be pulsed—it may be continuous, but it must have enough energy to melt the surface of the material so that the crack edges fuse together. The type of beam is immaterial as long as it can heat the material; for example, it is conceivable that laser beam or a proton beam could be used.

It is important that beam heating be performed in vacuum to prevent gas entrapment inside the crack. An electron beam weld requires a vacuum to operate while a laser beam device does not, but for the purpose of this process would require a vacuum environment.

If the crack 10 is shallow, complete healing can be accomplished by treatment with the high-energy beam alone. If the crack is deep, the surface of the crack is fused over with the high-energy beam treatment and then the interior of the crack is treated by hot isostatic pressing. The specimen is subjected to pressures of up to about 30,000 psi and temperatures sufficient to soften the material but below the recrystallization temperature of the material. Hot isostatic pressing is a known metallurgical process.

The sweep and motion directions of the specimen could be reversed. That is, the sweep of the beams could be from one edge of the crack 10 to the other (horizontally in FIG. 1) and the specimen 12 could be moved vertically.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for healing surface cracks in a meltable material comprising the steps of:

directing a diffused beam of high-energy at the edge of a surface crack in a meltable material, the energy of said beam being sufficient to melt the edges of the crack at its surface so that the edges will fuse together;

oscillating said beam from one end of the crack to the other; and moving said material at a slow rate laterally with respect to the direction of oscillation of said beam, wherein the level of energy applied to said material is insufficient to produce enough thermal shock to increase the crack width.

2. A method as in claim 1, wherein:
said material is metal.

3. A method as in claim 1, wherein:
said beam is an electron beam.

4. A method as in claim 1, wherein:
said beam is a pulsed beam.

5. A method as in claim 1, wherein:
the time of oscillation of said beam is approximately 0.0015 seconds per sweep.

6. A method as in claim 1, wherein:
the rate of lateral movement of said material is approximately 25 inches/minute.

7. A method as in claim 1, wherein:
the time of oscillation of said beam is approximately 0.0015 seconds per sweep and the rate of lateral movement of said specimen is approximately 25 inches per minute.

8. A method as in claim 4, wherein:
said beam is diffused so that the areas of adjacent pulses of energy overlap each other.

9. A method as in claim 1, wherein:
a vacuum environment is used to surface-melt the material.

10. A method as in claim 1, wherein:
the surface-sealed crack is hot isostatic pressed to seal the crack interior.

* * * * *